United States Patent [19]

Chodil et al.

[11] 3,899,636

[45] Aug. 12, 1975

[54] HIGH BRIGHTNESS GAS DISCHARGE DISPLAY DEVICE

[75] Inventors: Gerald J. Chodil, Harwood Heights; Michael C. De Jule, Chicago, both of Ill.

[73] Assignee: Zenith Radio Corporation, Chicago, Ill.

[22] Filed: Jan. 24, 1974

[21] Appl. No.: 436,294

Related U.S. Application Data

[63] Continuation-in-part of Ser. No. 396,273, Sept. 7, 1973, abandoned.

[52] U.S. Cl. .............. 178/7.3 D; 313/185; 313/220; 313/225; 313/484; 313/493

[51] Int. Cl.[2] . H04N 5/66; H01J 61/16; H01J 61/30

[58] Field of Search ........... 313/484, 485, 486, 493, 313/185, 220, 225, 228; 178/7.3 D; 315/169 R, 169 TV; 340/166 R, 324 M

[56] References Cited

UNITED STATES PATENTS

| | | | |
|---|---|---|---|
| 2,859,385 | 11/1958 | Bentley | 315/169 TV |
| 2,933,648 | 4/1960 | Bentley | 315/169 TV |
| 2,961,565 | 11/1960 | Lemmers | 313/109 |
| 2,967,965 | 1/1961 | Schwartz | 315/169 TV |
| 3,013,182 | 12/1961 | Russell | 315/169 R |
| 3,334,269 | 8/1967 | L'Heureux | 315/169 R |
| 3,499,167 | 3/1970 | Baker et al. | 315/169 TV |
| 3,622,829 | 11/1971 | Watanabe | 313/108 R |
| 3,654,507 | 4/1972 | Caras et al. | 315/169 TV |
| 3,704,386 | 11/1972 | Cola | 313/108 R |
| 3,743,879 | 7/1973 | Kupsky | 313/108 B |
| 3,749,969 | 7/1973 | Miyashiro et al. | 315/169 TV |
| 3,749,972 | 7/1973 | De Jule | 315/169 TV |
| 3,766,420 | 10/1973 | Ogle et al. | 315/169 TV |

*Primary Examiner*—Robert L. Griffin
*Assistant Examiner*—George G. Stellar
*Attorney, Agent, or Firm*—John H. Moore

[57] ABSTRACT

A high-brightness visual display device utilizing highly efficient gas discharge cells. Each cell includes a shallow elongated cavity having a relatively high surface-to-volume ratio, a special mixture of low pressure gas constituents which generate ultraviolet radiation when excited by an applied electric field, a priming electrode for generating free electrons to insure the rapid energization of the cell, and a phosphor coated wall facing the viewed side of the cell which emits light when bombarded by ultraviolet radiation generated within the cell.

1 Claim, 8 Drawing Figures

HIGH BRIGHTNESS GAS DISCHARGE DISPLAY DEVICE

CROSS REFERENCE TO RELATED APPLICATION

This application is a continuation-in-part of application Ser. No. 396,273, filed Sept. 7, 1973, assigned to the assignee of this application, and now abandoned.

BACKGROUND OF THE INVENTION

This invention is generally related to visual display devices. It is particularly directed toward an improved gas discharge display for use in high brightness visual display applications such as flat panel television, alphanumeric displays and the like.

In recent years many attempts have been made to fabricate flat television display panels. Such attempts have generally included the use of either light-reflective or light-generating cells arranged in an addressable matrix of rows and columns.

The flat panel television displays which have been made have generally not been accepted as practical replacements for standard television cathode ray tubes for the reason, among others, that the brightness of the displays has been poor in comparison with modern cathode ray tubes.

Because of the inherent relatively high brightness and high efficiency which is characteristic of standard fluorescent lamps, their mode of operation has been attempted to be duplicated in small gas discharge cells for use in flat panel displays. However, even when the brightness of the fluorescent lamps can be duplicated in a small cell, the total light output from an array of such cells is still much too limited for the following reason.

In operation, a standard fluorescent lamp, once energized, remains in a steadily excited state. However, the individual small gas discharge cells which might make up a display are not operated in the steady state mode of the fluorscent lamp. Rather, they are operated in a pulsed mode in which, in the case where they are used in television applications, they may be on for less than 1/500 of the total television scan time. As a result of the very low duty cycle of the individual cells, their average brightness is much lower than their peak brightness.

To compensate for this very low duty cycle and the resulting low average brightness, the peak brightness of a cell must be greatly increased so that the average brightness will be comparable to that of a good television cathode ray tube, i.e., approximately 100 foot lamberts.

To provide such an increase in a cell's peak brightness, the current through the cell must be greatly increased, perhaps by as much as 500 times or more. However, at current densities of the magnitude apparently required, the efficiency of converting a cell's total power input to useful visible light output is very greatly diminished. For example, when a fluorescent lamp having a normal operating efficiency of approximately 50 lumens per watt is pulsed at television rates with a current 500 times greater than the normal operating current of such a lamp, its efficiency may be expected to plunge more than two orders of magnitude to a few tenths of a lumen per watt or less.

To operate a 35 inch flat panel television display having gas discharge elements at a brightness of 100 foot lamberts with an efficiency of 0.1 lumen per watt, for example, would require a power input to the panel of over 4,000 watts. This is clearly at least an order of magnitude greater than desirable. To bring the power input down to a reasonable level while still providing a display having a brightness of 100 foot lamberts requires that the efficiency of such gas discharge cells be improved by a factor of at least 10. This requirement would appear to rule out the use of miniature fluorescent lamps as light-emitting elements in a flat panel television display.

Methods for improving the efficiency of fluorscent lamps have been proposed. See *Electric Discharge Lamps* by Waymouth, M.I.I. Press, 1971. There has, however, been no indication that such proposals are applicable to the field of flat panel gas discharge cells, or that, if implemented, they would result in the degree of improvement required in the efficiency of pulsed, high current density gas discharge cells. On the contrary, a recent study entitled *Principles and Techniques in Multi-Colour DC Gas Discharge Displays* by Z. V. Gelder et al, published by Phillips Research Laboratories, points out that the efficiency of such cells is still much less than 1 lumen per watt, a clearly inadequate level of efficiency.

One of the keys to putting flat panel video displays into serious competition with cathode ray tubes in the near future is a breakthrough in the efficiency of the light emitting devices. However, in spite of the existence of suggestions which appear in the literature describing fluorescent lamps having improved efficiencies, the answers, up until now, have not been found as to how to create a gas discharge device capable of operating efficiently enough to generate the high brightness required of a flat panel display at acceptable levels of power consumption. General suggestions regarding possible ways to improve efficiency and brightness have failed to mature into commercial realities.

In addition to the requirement of acceptable efficiency, a commercially practicable gas discharge cell should also be capable of producing any of three primary colors in order that a panel composed of an array of such cells be able to reproduce colored images having a colormetric quality comparable to that of present day color television cathode ray tubes.

PRIOR ART

An article entitled, *Good Quality TV Pictures Using A Gas Discharge Panel*, by G. J. Chodil et al., published in the *IEEE Conference Record of 1972 Conference on Display Devices;* an article entitled, *Plasma Display Changes Color as Current Input Changes*, by Rudolph Cola, published in the July 19, 1971 edition of *ELECTRONICS;* U.S. Pat. Nos.: 2,967,965; 3,121,183; 3,334,269; 3,704,386; 3,749,969; 3,771,008; German Pat. Nos.: OLS 1,966,500; OLS 2,137,760; and OLS 2,213,153.

OBJECTS OF THE INVENTION

It is a general object of the present invention to provide an improved visual display device.

It is another object of the invention to provide a flat panel image display reproduction device suitable for use in displaying television images.

It is a more specific object of this invention to provide a much more efficient gas discharge cell for flat panel television displays capable of operating at brightness levels which are comparable with high brightness cathode ray tubes.

It is yet another object of this invention to provide highly efficient gas discharge cells for flat panel television displays which are capable of generating any of three primary colors so that an addressable array of such cells may reproduce colored images.

BRIEF DESCRIPTION OF THE DRAWINGS

The features of the invention which are believed to be novel are set forth with particularity in the appended claims. The invention, together with further objects and advantages thereof, may best be understood, however, by reference to the following description taken in conjunction with the accompanying drawings in which:

DESCRIPTION OF THE PREFERRED EMBODIMENT

As pointed out in the discussion above, this invention is directed toward an improved flat panel display and a more efficient gas discharge cell for use therein. Before beginning a description of the improved cell, a brief examination of the basic mode of operation of a gas discharge cell will be undertaken.

Figure 1:
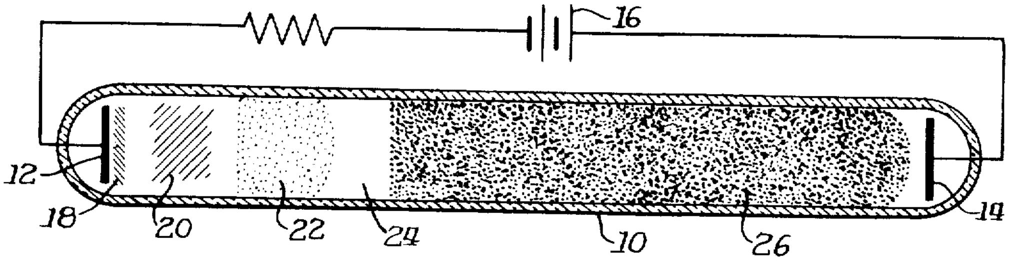
FIG. 1 schematically depicts a conventional gas discharge device.

Gas discharge cells are generally enclosed within a glass envelope as shown in FIG. 1. Within the envelope 10 is a cathode 12 and an anode 14. A gas, neon for example, is maintained at a pressure of a few millometers of mercury within the envelope. Voltage source 16 provides the anode to cathode potential for generating an electric field which accelerates free electrons within the envelope.

Cosmic rays or other stimuli may generate some ions and free electrons within the glass envelope, thereby causing the gas to be somewhat conductive even at low potentials. As the electric field builds up, the free electrons are accelerated within the envelope, colliding with one another and with the gas atoms. Some electron-atom collisions result in the ionization of a gas atom, thereby generating additional free electrons and ions. The freed electrons are then accelerated by the electric field generated by the anode to cathode potential and develop a kinetic energy which, upon colliding with another gas atom, they may impart to the atom. If the kinetic energy of the colliding electron is high enough, the atom will be ionized. Assuming that the electric field is strong enough, this action will continue until there are enough liberated electrons to make the gas a good electrical conductor and the process self-sustaining.

Although only a small percentage of free electrons gain enough energy to ionize a gas atom, a substantial number of them do have sufficient energy to impart a predeterminable, discrete unit of energy (quantum) to such atoms. A transfer of energy from an electron to an atom can occur only in these discrete energy units because atoms can exist only in discrete energy states. These states are characterized by integral quantum numbers.

When an electron collides with an atom so that a transfer of energy occurs from the electron to the atom, the atom may be raised from its lowest energy state to a more energetic or excited state. Since the excited state is not a stable condition for an atom, it will, after an interval of a few hundred nanoseconds, give up part or all of its recently acquired energy by dropping back to a lower energy level. Such a change of energy states is accompanied by emission of electromagnetic radiation of a frequency $\nu$, such that the product $h\nu$ is equal to the energy difference between the two states ($h$= Planck's constant).

Assuming that the electric field generated by the potential between cathode 12 and anode 14 is strong enough, a "glow discharge" will exist and portions of the gas within envelope 10 will become luminous. When the gas is in this glow discharge state, the area between the anode and the cathode will have several fairly discrete luminous and non-luminous areas.

Adjacent to cathode 12, a cathode layer 18 is formed which consists of a thin luminous layer of gas. Immediately following the cathode layer is a non-luminous region 20 called the Crookes dark space. Beyond this, there is a second luminous region 22, generally referred to as the negative glow. This is the glow that is normally seen in the typical neon bulb.

Following the negative glow region is the Faraday dark space 24, a relatively dark region, followed by the positive column 26 which may be striated with alternate luminous and non-luminous regions. In the case of a typical 4 foot fluorescent lamp the positive column extends for almost the entire length of the lamp.

Where a gas discharge device is to be used to generate light of a predetermined color, as in a fluorescent lamp, the inner surface of the glass envelope is covered with a light emissive phosphor coating and the parameters of the device, including the gas constituents and the energy distribution of the free electrons, are generally chosen such that the electromagnetic radiation emanating from the positive column is of a frequency $\nu_1$ which places it in the ultraviolet spectrum. This means that at least one gas constituent must have two energy states whose energy difference ($e_1-e_2$) is equal to the product $h\nu_1$. Then, as an excited gas atom relaxes from the higher energy state $e_1$ to the lower energy state $e_2$, the radiant energy released will have a frequency $\nu_1$ associated with it which is in the ultraviolet spectrum.

The ultraviolet (UV) radiation may then be converted into visible light by directing the UV radiation onto the ultraviolet-excitable phosphor coating covering the inside of the glass envelope. When excited, the phosphor coating emits visible light of the predetermined color.

Figure 2:
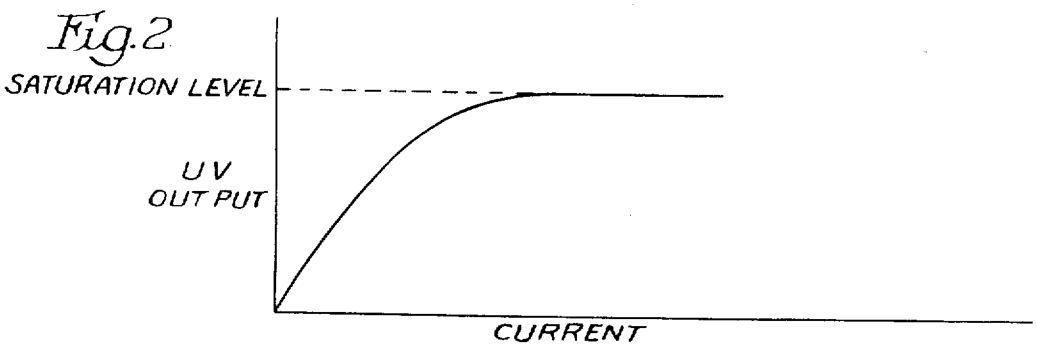
FIG. 2 is a graph illustrating the relationship between cell current and ultraviolet output of a gas discharge device.

Generally, the brightness of a fluorescent lamp may be controlled by controlling the current through the lamp. However, if the current through the lamp is increased beyond a certain point, the emission of UV radiation from the positive column will increase to a saturation level beyond which it will not increase. This effect is illustrated in FIG. 2 which indicates a definite saturation level for the ultraviolet output. Obviously, if the UV radiation from the positive column does not increase with increasing current, neither does the visible light emitted by the lamp.

Should a fluorescent lamp or other gas discharge device be operated beyond the point where such saturation begins, the efficiency of the lamp or device will rapidly decrease. The reason for this saturation effect is that secondary effects begin to play a larger role as current is increased. For example, rather than exciting an atom from a lower to a higher energy state, an electron may, upon colliding with an excited atom, remove energy from the atom and leave it in a lower energy state.

Figure 3:
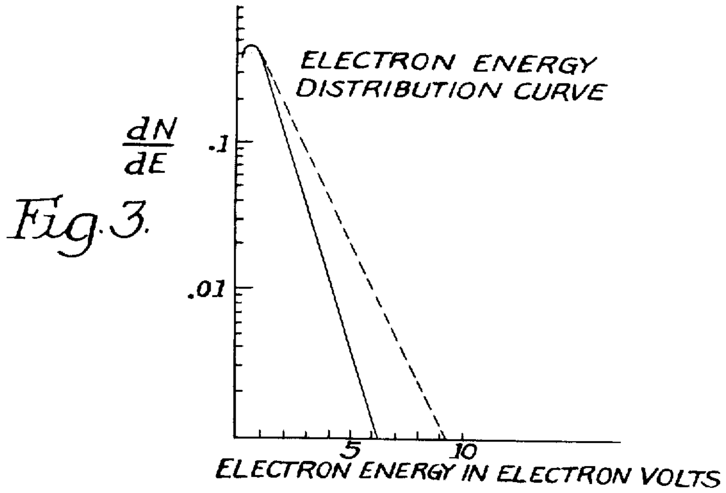
FIG. 3 is a graph showing the distribution of free electrons according to their energy levels in the positive column of a gas discharge.

In order to explain one of the primary problems associated with the operation of typical prior art gas discharge cells at high current densities, a graph such as that shown in FIG. 3 is very helpful. It indicates the relative number of free electrons which exist at various energy levels within the discharge. Should such a curve indicate that only a small percentage of free electrons exist at energies within the range useful in a particular application, this would indicate a substantially inefficient condition. For example, if one of the gaseous constituents of a discharge cell happens to be mercury vapor which is UV-emissive when excited by electrons having an energy of at least 5 electron volts (ev), a curve showing that a large percentage of free electrons within the gas exist within a range which includes 5 ev would indicate that the cell is probably being operated in a rather efficient mode. On the other hand, if very few electrons were indicated as being within the range that included 5 ev, the operating mode would probably be so inefficient that an increase in cell current might result in only an imperceptible increase in UV radiation. The solid curve shown in FIG. 3 illustrates the energy level distribution of free electrons in a typical gas discharge cell having a high current density. Note the small percentage of electrons which exist at the 5 ev point. Such a curve is indicative of an inefficiently operated discharge device and is typical of prior art gas discharge cells.

By applying the teachings of this invention which are discussed below, the FIG. 3 curve can be effectively moved to the right as illustrated by the dashed line. Such a move obviously increases the number of available electrons having energies of at least 5 ev which are available to excite mercury vapor into UV radiation. Therefore, when cell current is increased in order to increase UV radiation and hence cell brightness, a large number of electrons are available at energy levels sufficient to provide the required UV excitation. The result is a gas discharge cell having an efficiency which permits the attainment of high brightness levels without excessive power drain.

Before proceeding to a detailed discussion of the principles of this invention, a brief examination of the energy levels of the mercury atom is in order so that the significance of the 5 ev energy level may be appreciated.

Figure 4:
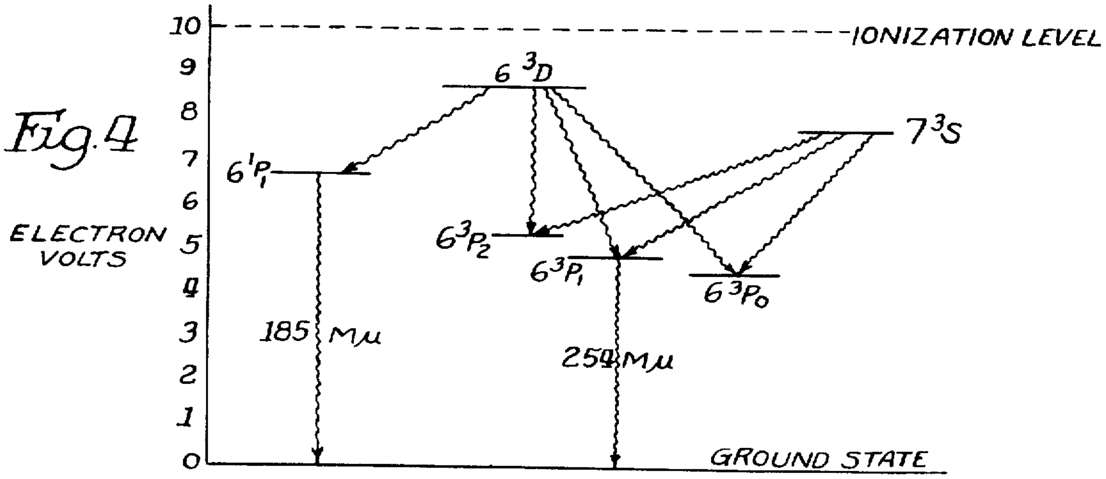
FIG. 4 depicts several states of a mercury atom and the allowed energy level transitions.

Referring now to FIG. 4, there is shown an energy level diagram for mercury where each horizontal line represents a possible state of excitation. The arrows represent permissible changes of state. The numbers adjacent to each arrow represent the radiation in nanometers which is emitted as the indicated change of state is effected.

The $6^3P_1$ state is the one of primary interest since it is from this state that a mercury atom emits UV radiation when it relaxes to the ground state. The $6^3P_2$ and the $6^3P_0$ states are states from which an excited mercury atom cannot relax directly to the ground state. Should a mercury atom be excited to either the $6^3P_2$ or the $6^3P_0$ state, it must remain there until the atom either gains or loses sufficient energy to place it in another state. In practice it is very likely than an atom in either of these states may make the transition to the $6_3P_1$ state by either gaining or losing a fraction of an ev of energy as required.

The next permissible state from which a transition can be made to the ground state is the $6^1P_1$ state whose energy is approximately 7 ev as compared to the 5 ev of the $6^3P_1$ state. The dashed curve of FIG. 3 indicates that there is a greater number of electrons at 5 ev than at 7 ev. Consequently, the UV radiation from the $6^3P_1$ state is likely to be much stronger than that from the $6^1P_1$ state. However, in order to more accurately determine the relative differences in radiation levels from different states the different excitation cross sections should also be taken into account.

Accordingly, it is an object of the improvements to gas discharge cells that will be disclosed herein to effectively cause the energy level curve of FIG. 3 to be moved far enough toward the right so that many more electrons are capable of exciting a mercury atom into UV radiation.

Although the discussion up to this point has concentrated primarily upon gas discharge cells containing mercury vapor, it should be noted that the teachings to be disclosed hereinafter are also applicable to cells containing gases other than mercury vapor. In the event that another gas is used, the energy level curve will accordingly be moved to correspond to the point where a substantial number of electrons are available for proper UV excitation of the particular gas.

At this point, it is appropriate to point out a discovery which prompted an examination of the gas discharge characteristics shown in FIG. 3; namely, that at the high current densities required of gas discharge cells in television and other high brightness applications, the curve shown in FIG. 3 tends to move to the left. As a result, even fewer electrons are able to provide the UV excitation required. This invention, therefore, concentrates on moving the curve back to the right to produce a higher concentration of free electrons at the required UV excitation level. In order to effect such a concentration of electrons, the geometry of the gas discharge cell enclosure, the gas constituents, and the gas pressures are selected in accordance with the directions to follow. It is the combined effect of improving the parameters associated with all three variables which permits a gas discharge cell to operate at the high efficiency required. The geometry proposed by this invention for such a cell will be considered first.

In an enclosed positive column, electrons and ions are being constantly generated and lost, presumably at the same rate if the system has reached a steady state. As described above, one of the principal means by which electrion-ion pairs are generated is by the collision of energetic electrons with gas atoms. For the gas pressure range of concern here, the mechanism by which electron-ion pairs are lost is predominantly that of recombination at the walls of the enclosure. The larger the surface area of the enclosure, the more the surface tends to act as an electron-ion sink. This has an important effect on the state of the positive column.

In a positive column, the free electrons are said to have an electron temperature, which is another way of defining their average kinetic energy. The electron temperature at which a positive column becomes self-sustaining is dependent upon the rate at which electrons are generated and lost. Since the dimensions of the enclosure surface dictate the rate at which electrons and ions are lost (and thus also the rate at which they must be generated), the geometry of a cell and its enclosure are important aspects of cell design which must be tailored to be compatible with other cell parameters. At the high electron temperatures contemplated by this invention, electrons and ions must be generated and permitted to recombine at relatively fast rates in order to sustain a positive column in a condition conducive to the efficient generation of ultraviolet radiation at high current densities. Accordingly, a cell enclosure will have a relatively large inner surface area. This will help move the curve of FIG. 3 to the right.

Another important aspect of cell geometry concerns the length of the cell. In order to increase the fraction of the total input power which the positive column consumes, the length of the column should be large with respect to other cell dimensions. This will permit a greater fraction of input power to be converted into useful ultraviolet radiation and result in more efficient operation. The cell enclosure, therefore, should be elongated to permit the generation of a relatively long positive column.

A final consideration which affects cell geometry is that of the mean free path which a generated UV photon must travel in order to impinge upon a phosphor-coated wall of the cell enclosure. If a photon must travel over a relatively long path before arriving at an enclosure wall to excite the phosphor coating, it is very likely to be reabsorbed by a gas atom. Although an absorbing atom frequently re-emits the photon, there is some probability that the atom's newly acquired energy can be dissipated in some other manner. For example, the atom may be further excited to a higher energy level from which it may relax to the ground state and emit radiation having a frequency that is not useful for the excitation of the phosphor. Therefore, by providing a relatively short mean free path for the generated photons, chances are improved that any UV photon will ultimately strike the phosphor-coated enclosure wall.

Figure 5:
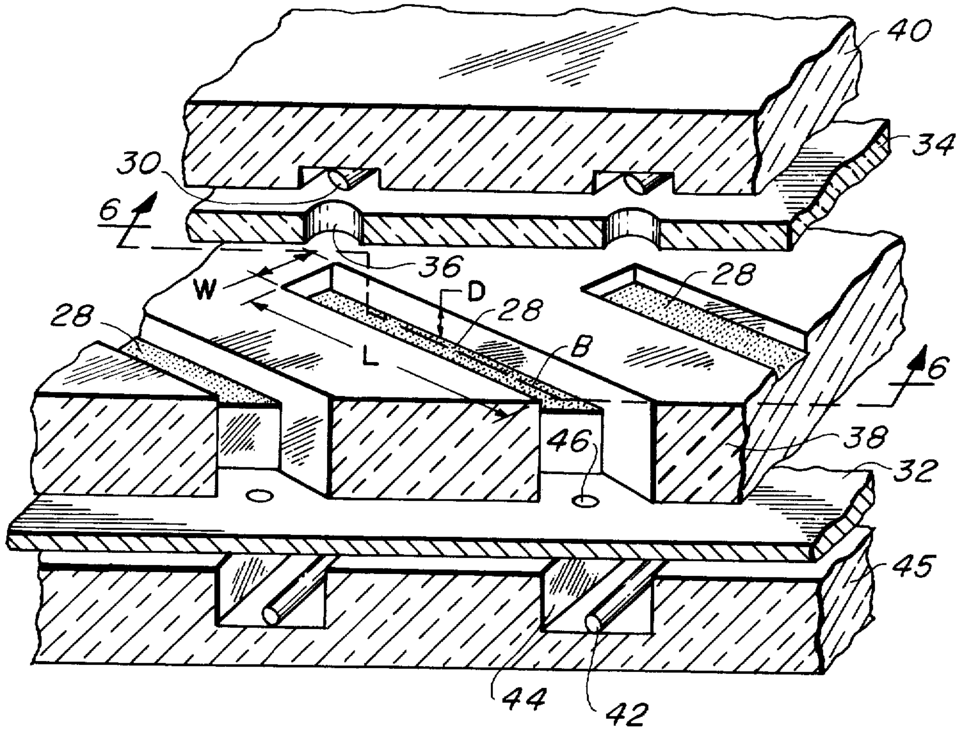
FIG. 5 is an exploded schematic view of a video panel which depicts a preferred embodiment of this invention.

Considering that the geometry of a cell enclosure should have a relatively large surface area to permit rapid electron-ion recombination, that the length of the positive column should be greater than other cell dimensions to allow the column to dissipate more energy, and that the mean free path of generated photons should be minimized, an enclosure for a gas discharge cell constructed in accordance with this invention may preferably take the form shown in FIG. 5. Here a cell is shown in a form suitable for array in a large panel of gas discharge cells. An elongated groove or cavity 28 formed in a cell sheet 38 contains the gas discharge which is formed between an anode 30 and a cathode 32. In a flat panel television application, the cavity preferably may have a length "L" of from about 30 to 70 mils, a width "W" of from about 10 to 15 mils and a depth "D" of approximately 2 to 5 mils.

Cell sheet 38 is preferably composed of a ceramic or glass substance which should be essentially opaque and light-absorptive in order to minimize visible light crosstalk between cells and to absorb ambient illumination of the panel.

Figure 6:
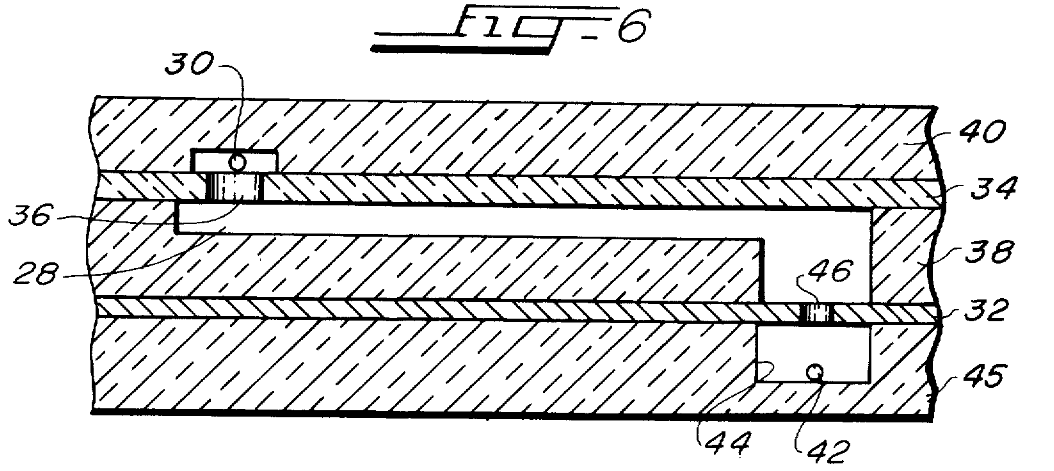
FIG. 6 is a sectional view of the panel taken along section lines 6—6 of FIG. 5.

A dielectric plate 34, preferably composed of transparent glass, covers the top of the cavity 28 to complete the enclosure of the gas discharge. A hole 36 is provided in plate 34 to confine the gas discharge to cavity 28 and prevent crosstalk between adjacent cells. A front sheet 40, preferably also of transparent glass, covers the plate 34. FIG. 6, a sectional view of the FIG. 5 cell, illustrates more clearly how the cell is assembled.

The anode 30 is shown as a round wire conductor. It may, however, also be screened onto its adjacent supporting member in accordance with well-known screening techniques, or be fabricated by any of a number of other suitable methods.

Although cell 28 is shown as being straight, it need not be. As long as it meets the above-stated criteria, it may take shapes other than that shown and still operated efficiently.

The bottom wall of groove 28, labeled "B" in FIG. 5, is covered with an ultraviolet excitable phosphor coating which responds to the bombardment of the UV radiation generated within cavity 28 by emitting a visible light of a predeterminable color. In a black and white TV panel application, the phosphor would be selected to be white light-emissive. In a color TV application, the phosphor would be selected to emit red, blue or green light.

Since the cell is meant to be viewed from the top (corresponding to the top of the page), a maximum amount of light-emissive phosphor is preferably exposed to the viewed side of the cell. The remaining walls enclosing cavity 28 may also be phosphor coated, particularly the bottom surface of dielectric plate 34 which is situated directly above the cavity.

The FIG. 5 cell provides, in accordance with the above-described efficiency criteria, a high surface-to-volume ratio, a relatively short mean free path for generated UV photons and permits the generation of a relatively long positive column between anode 30 and cathode 32.

Priming means, including an electrode 42, lying in a groove 44 in a bottom sheet 45, will be discussed below along with other features and advantages of the FIG. 5 cell which relate to different aspects of this invention.

Aside from cell geometry, the other two possibly most important parameters of a gas discharge cell for use in high brightness applications, such as flat panel televisions displays, are the gas constituents themselves and the pressure at which these gas constituents are maintained within the cell. Turning first to a discussion of the preferred gas constituents of a discharge cell constructed in accordance with the principles of this invention, it will be recalled that mercury was mentioned in the discussion above as being particularly attractive for use in generating UV radiation. Therefore, mercury is a natural choice for use in such a cell since it is perhaps two to three times as effective in generating UV radiation in the particular environment in question as any other gas.

It is well known in the art of fluorescent lamps that combining mercury with a rare gas allows one to control the diffusion rate of electrons and ions to the enclosure wall and thus to provide an effective means for controlling the electron temperature associated with the positive column. This control is apparently accomplished by the effect which the rare gas has on the mobility of mercury ions. The lighter the rare gas the greater the mobility of mercury ions.

In light of the conclusion above that light rare gases increase the mobility of mercury ions, we have found that a mixture of helium, the lightest gas, and mercury gas allows one to control the electron temperature of the positive column to the extent required to provide a highly efficient gas discharge device. Depending upon the particular application, other light gases such as neon, argon, or mixtures thereof may be chosen and may provide sufficient control of the electron temperatures for a particular application. However, helium appears to be the most desirable of the light rare gases. Its effect on the state of a positive column is to help move the FIG. 3 curve to the right and thus help to increase the concentration of electrons at the 5 ev energy level.

The final parameter of the gas discharge deivce toward which this invention is directed is the pressure at which the gas constituents are maintained. It is known in the field of fluorescent lamps that the pressure of the ionized rare gas affects the diffusion rate of ions and electrons and thus has a direct effect on electron temperature. Lowering the pressure of the rare gas tends to move the curve of FIG. 3 to the right. However, as the rare gas pressure is lowered, the gas breakdown voltage eventually increases. Continued lowering of this pressure may cause the breakdown voltage to exceed the practical limits of a particular application. Thus, a compromise is made in choosing the lowest practical rare gas pressure.

In addition to the rare gas pressure, the pressure at which mercury gas is maintained within the gas discharge cell likewise has an important effect on electron temperature. At too low a mercury pressure the mercury atom density is too low to produce sufficient UV radiation. At too high a mercury pressure the electron temperature decreases and thus the curve in FIG. 3 moves to the left. There is then also an optimum mercury pressure range and any substantial deviation from that range will cause a decrease in UV radiation production.

We have found that by maintaining the pressure of helium in the 10 to 500 Torr range and the pressure of mercury vapor in the 0.01 to 0.3 Torr range we are able to bring the electron temperature in the positive column to a point where a high degree of efficiency is obtained.

By meeting the above taught conditions with respect to the geometry of the gas discharge enclosures, the gas constituents and their associated pressures, we have been able to achieve an electron temperature within the positive column of a miniature TV flat panel gas discharge cell which is high enough to insure efficient operation of gas discharge devices even at the high current densities required of high brightness TV flat panels. For example, using the geometry of the FIG. 5 gas discharge cell with the cavity 28 filled with mercury vapor and helium at pressures of approximately 0.1TORR and 100TORR respectively, we have been able to achieve an efficiency of 2.5 lumens per watt at the current levels required to produce an effective brightness of 100 foot lamberts in a 35 inch diagonal panel composed of an array of such cells. This is a very significant improvement in efficiency over any known gas discharge device used in similar applications.

The final aspect of cell design which will be discussed relates not to the above-mentioned problems associated with cell brightness, but rather to the uniformity with which the gas discharge cells in an array of such cells respond to their applied anode-to-cathode potentials. Due to unavoidable variations in the parameters of the gas discharge cells, such as variations in the depth of the grooves among the various cells, each cell tends to "fire" at a slightly different level of applied voltage. Since the preceived brightness of a cell is a function both of its peak brightness and the duration of its discharge, variations among the cells in response time will result in some cells being "on" for longer periods than others. As a result, the cells will be incapable of achieving equal effective brightness levels for the same cell current. A consequence of this non-uniformity in firing potential may result in an effective loss of contrast in an overall video display.

A way of avoiding the problem of non-uniformity of firing potential is to cause each cell to fire promptly upon the application of the required breakdown voltage across the cell. The response of each cell to its own applied voltage may be hastened and the uniformity of response time improved by "priming" each cell. As used herein, priming refers to providing a sufficient number of free electrons in the cell enclosure between the anode and the cathode to allow the cell to fire at a lower and more predictable breakdown voltage. This causes each primed cell to respond to its applied anode-to-cathode potential quickly and uniformly and provides for a greater uniformity in cell brightness and a greater available contrast range.

A convenient and well-known method for providing the above-described priming is to provide an additional priming electrode for each cell. By establishing a potential between the cathode and the priming electrode which is less than the potential required to cause a breakdown of the gas within the cell, a sufficient number of free electrons may nevertheless be generated for conditioning the cell to fire at the desired lower breakdown voltage.

An example which illustrates the above-described method of priming is shown in FIG. 5. A priming electrode 42 is laid in a groove 44 formed in bottom sheet 45. A source of voltage (not shown) is applied between cathode 32 and priming electrode 42 of approximately 150 volts. The electric field thus developed between cathode 32 and priming electrode 42 causes free electrons to be developed within the spacing between them. A priming hole 46 is provided in cathode 32 through which electrons, metastable atoms and UV photons diffuse into the main discharge cavity 28. This arrangement is believed to be similar to other such priming arrangements used in some prior art gas discharge displays.

The provision of free electrons in cavity 28 enables the positive column to be quickly established in response to an application of electric potential between anode 30 and cathode 32. It also suppresses the well-known tendency of a gas discharge device to oscillate at low levels of cell current, particularly in cases where the brightness of a cell is varied by modulating cell current. Under such conditions a gas discharge device may tend to operate as a relaxation oscillator if priming or another method of suppressing oscillations is not provided.

Another point which should be considered in the use of a gas discharge display is the temperature of the gas within the cell. For example, in the practice of this invention where the mercury vapor is maintained at a pressure of about 0.01 torr, the temperature of the gas should be approximately 47° C in order to sustain the mercury vapor at the correct pressure. Higher mercury pressures require correspondingly higher temperatures. In an application requiring a mercury vapor pressure of 0.3 torr, a temperature of about 102° C should be satisfactory.

In many cases where the desired temperature is not too high, the self-heating of the panel itself adequately heats the gas. If required, the entire panel may be placed in a thermally insulating envelope to retain the heat developed by the panel. If the self-heating of the panel does not provide sufficient heat for the gas, an external heat source may be required.

A final point to be considered in the construction and use of this type of gas discharge panel is the sealing together of the various layers of the panel. One way which has proved to be satisfactory is to apply a thin layer of low melting point clear glass on the top and bottom sides of plate 34. See FIG. 5. Sheets 40, 34 and 38 may then be pressed together and sealed together to form an integral unit. This will tend to prevent unwanted electric discharge paths from developing between adjacent cells and electrodes within the panel.

Sheet 38, cathode 32 and bottom sheet 45 may, if desired, also be sealed together by means of a low melting point glass. The entire assembled panel may then be given a final seal by applying a solder glass around the entire perimeter of the panel.

By combining the ideas discussed above relating to cell geometry, choice of gas constituents, and gas pressure, a much improved gas discharge cell may be constructed. A video or alpha-numeric display panel composed of an array of such cells is capable of achieving the high brightness and contrast levels associated with high quality cathode ray tubes. In addition, the increased operating efficiency of such a panel causes the power drain of such displays to be at a level not inconsistent with commercial consumer applications.

Figure 7:
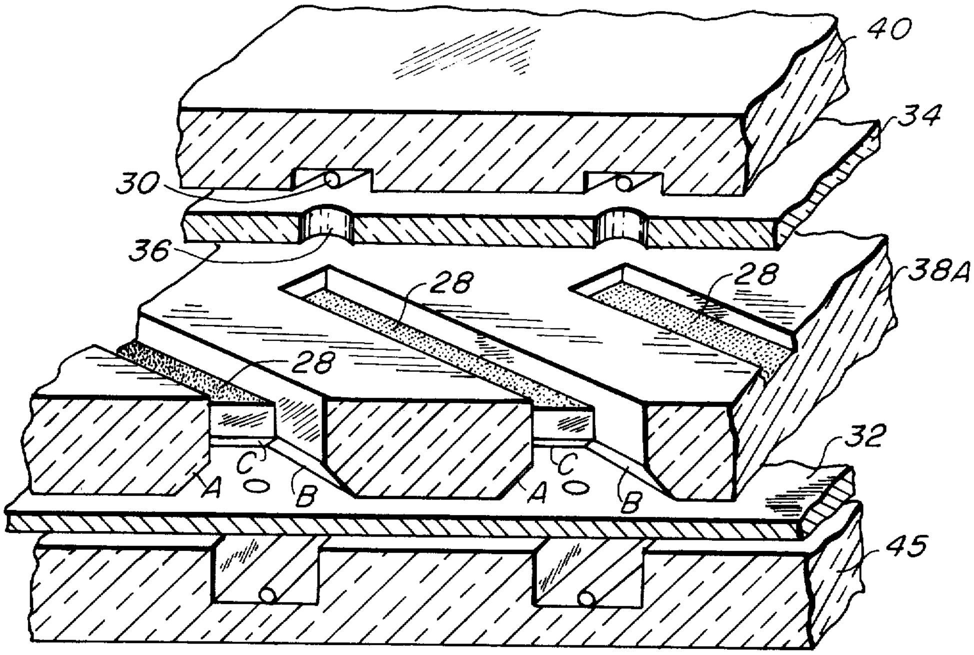
FIG. 7 depicts a panel similar to that shown in FIG. 5, but having an improved cathode area.

FIG. 7 depicts a gas discharge panel very similar to the panel of FIG. 5 except that sheet 38A has been undercut at points A, B and C to expose more surface of cathode 32 to its cell 28. In this way, an increased current can be drawn from cathode 32 without greatly increasing the current density in any elemental cathode area.

Figure 8:
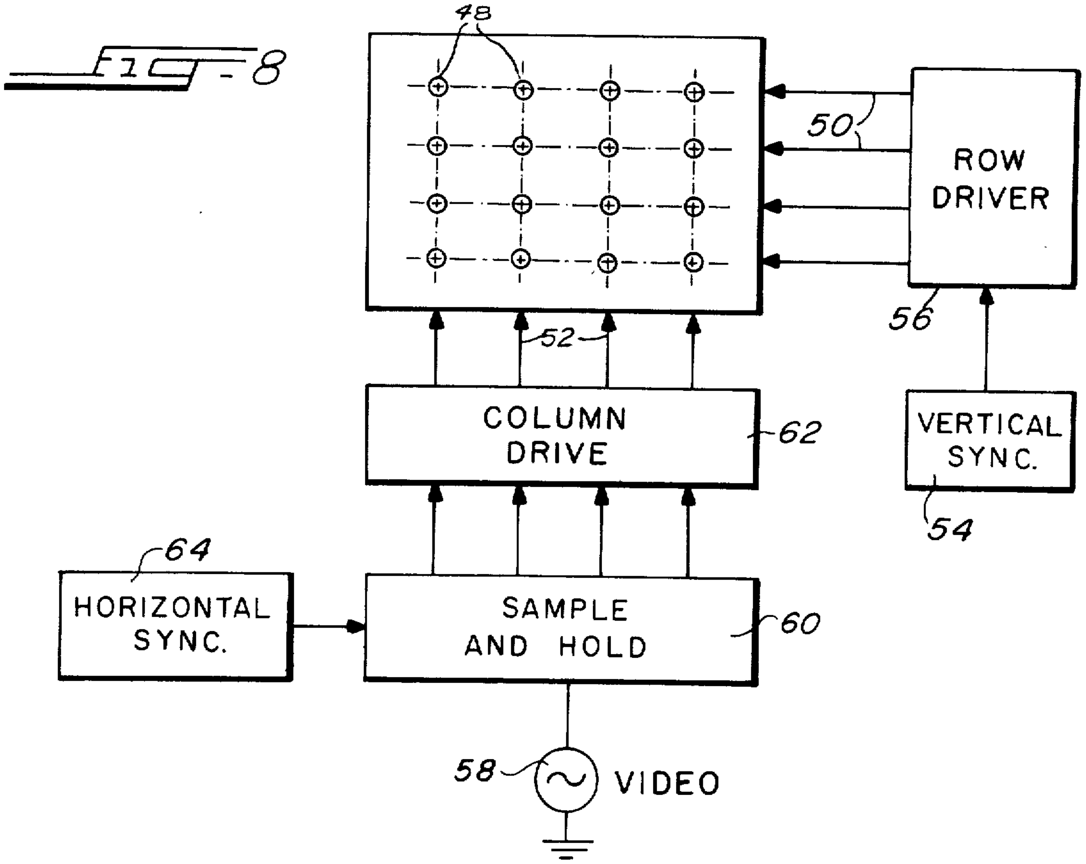
FIG. 8 schematically portrays means for driving a panel display built in accordance with this invention.

FIG. 8 illustrates in schematic form a panel composed of an array of gas discharge cells of the type described and its associated drive circuitry. The cells 48 are located at the intersection of row electrodes 50 and column electrodes 52. A source of vertical sync 54 is coupled to row driving means 56 which in turn applies cathode potentials to successive rows of cells. The vertical sync synchronizes cell rows with a received television image.

A source of television video signals 58 is coupled to sample and hold means 60 which samples the video signal and stores a voltage which corresponds to the amplitude of the sample video signal. The stored voltages are fed to column driver 62 in response to a signal from a source of horizontal sync 64 for synchronizing the scan of successive cell columns with a received television signal. Column driver 62 is coupled to the column electrodes 52 for applying potentials to the anodes.

In order to provide a displayed image with a gray scale, column driver 62 may be capable of modulating the current through the various cells and thereby modulating the brightness of such cells in accordance with the brightness levels of corresponding video elements in the video signal. Alternatively, column driver 62 may modulate the brightness of the cells by varying the conduction time of each "ON" cell to achieve an effective varying brightness.

The explanation immediately above and the circuitry of FIG. 8 are meant to be neither exhaustive nor comprehensive, but are representative of the type of circuitry, most of which is well-known in the art, which is required to drive a typical gas discharge display panel.

While the invention has been described with specific embodiments thereof, it is evident that many alterations, modifications and variations will be apparent to those skilled in the art in light of the above disclosure. For example, the geometry of the FIG. 5 cell and the electrode placement may take a variety of forms without departing from the essence of the invention. Accordingly, it is intended to embrace all such alterations, modifications and variations which fall within the spirit and scope of this invention as defined by the appended claims.

We claim:

1. For use in a high brightness, high efficiency gas discharge display panel having a matrix of rows and columns of gas discharge cells in which the positive columns are established for generating ultraviolet radiation for illuminating a light-emissive phosphor coating on a cell wall, an improved gas discharge cell capable of operating efficiently at current densities up to 5 amperes per square centimeter for generating a high brightness display even when pulsed at television rates, said cell comprising:

means defining a shallow, substantially rectangular, elongated cavity having a high surface to volume ratio and a length, width and depth selected for generating a long positive column and a short path to the walls of the cavity for photons generated in the positive column, the length of said cavity being from 30 to 70 mils, the width of said cavity being from 10 to 15 mils, and the depth of said cavity being from 2 to 5 mils;

a cavity wall extending lengthwise of the cavity, having a coating of a light emitting phosphor thereon, and oriented such that the phosphor coating is exposed to the viewed side of the cell;

a gas filling said cavity and comprising helium at a pressure of approximately 100 torr and mercury vapor at a pressure of approximately 0.1 torr; and anode means and cathode means situated near opposite ends of said cavity between which cell current flows when a positive column is established within the cavity, the combination of said gas, gas pressure and cavity geometry together operating to increase the energy of free electrons within the positive column and to thereby increase cell efficiency and brightness.

* * * * *